United States Patent
Haverinen (10) Patent No.: US 8,122,250 B2
(45) Date of Patent: *Feb. 21, 2012

(54) AUTHENTICATION IN DATA COMMUNICATION

(75) Inventor: Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 170 days.

This patent is subject to a terminal disclaimer.

(21) Appl. No.: 12/315,528

(22) Filed: Dec. 4, 2008

(65) Prior Publication Data

US 2009/0183003 A1 Jul. 16, 2009

Related U.S. Application Data

(63) Continuation of application No. 10/451,875, filed as application No. PCT/IB01/02822 on Dec. 21, 2001, now Pat. No. 7,472,273.

(30) Foreign Application Priority Data

Dec. 27, 2000 (FI) ..................................... 20002858
Jan. 12, 2001 (FI) ..................................... 20010080

(51) Int. Cl.
*H04L 9/00* (2006.01)
(52) U.S. Cl. ....................................................... 713/168
(58) Field of Classification Search .................. 713/168
See application file for complete search history.

(56) References Cited

U.S. PATENT DOCUMENTS

| | | | |
|---|---|---|---|
| 5,535,276 A | 7/1996 | Ganesan | 380/25 |
| 5,684,950 A | 11/1997 | Dare et al. | 395/187.01 |
| 5,737,419 A | 4/1998 | Ganesan | 713/169 |
| 5,778,065 A | 7/1998 | Hauser et al. | 713/155 |
| 6,064,736 A | 5/2000 | Davis et al. | 713/155 |
| 6,973,671 B1 | 12/2005 | Hsing et al. | 726/8 |

FOREIGN PATENT DOCUMENTS

| | | |
|---|---|---|
| WO | WO-99/31841 A1 | 6/1999 |
| WO | WO-00/02406 A2 | 1/2000 |
| WO | WO-00/30285-AI | 5/2000 |
| WO | WO-00/64088 A1 | 10/2000 |

OTHER PUBLICATIONS

3GPP, Security Architecture (Release 1999), TS 33.102 V3.6.0 (Oct. 2000).

(Continued)

*Primary Examiner* — Benjamin Lanier
*Assistant Examiner* — Devin Almeida
(74) *Attorney, Agent, or Firm* — Harrington & Smith (57) ABSTRACT

Method of authenticating a client comprising the steps of sending a subscriber identity to an authentication server; obtaining at least one challenge and at least one first secret to the authentication server based on a client's secret specific to the client; forming first credentials; forming a first authentication key using the at least one first secret; encrypting the first credentials using the first authentication key; sending the at least one challenge and the encrypted first credentials to the client; forming an own version of the first authentication key at the client; decrypting the encrypted first credentials using the own version of the first authentication key. In the method, the encrypted credentials are sent together with the at least one challenge to the client so that the client can proceed authentication only if it can derive the first secret from the at least one challenge.

31 Claims, 7 Drawing Sheets

OTHER PUBLICATIONS

M. Swift, J. Trostle, B. Aboba, G. Zorn; Initial Authentication & Pass Through.

J. Kohl, C. Neuman; Kerberos Network Authentication Svc (V5).

J. Linn, Generic Security Svc Application Program Interface (V 2, U 1).

David Halasz et al., "doc.: IEEE 802.11-00/382"; Nov. 2000.

William Stallings, Cryptography and Network Security: Principles and Practice ($2^{nd}$ Edition), Chapter 11—Authentication Applications, pp. 323-340.

Steiner et al., "Kerberos: An Authentication Services for Open Network System", Proceeding of the USENIX Winter Conference, Feb. 1988, pp. 191-202.

Bellovin et al., "Limitations of the Kerberos Authentication System", Proceeding of Winter 1991 USENIX Conference, 1991, pp. 119-132.

3 GPP TS 33.101 V.3.6.0 (Oct. 2000), "Security Architecture (Release 1999)", $3^{rd}$ Generation Partnership Project; Technical Specification Group Services and System Aspects; 3 G Security, pp. 1-81.

AUTHENTICATION IN DATA COMMUNICATION

CROSS-REFERENCE TO A RELATED PATENT APPLICATION

This patent application is a continuation of U.S. patent application Ser. No. 10/451,875, filed Nov. 3, 2003 now U.S. Pat. No. 7,472,273, which claims priority from PCT Patent Application Serial No. PCT/IB01/02822 filed Dec. 21, 2001 which claims priority from the Finland Patent Applications No. 20002858, filed Dec. 27, 2000, and No. 20010080, filed Jan. 12, 2001.

TECHNICAL FIELD

This invention relates to authentication in data communication. In particular the invention relates to, but is not limited to, authenticating mobile stations and network servers communicating with each other through a network such as the Internet.

BACKGROUND

The Internet is used to share public information. Since it is an open system, it should not be used to share confidential information unless precautions are taken to protect the information by use of passwords, encryption and the like. Even so, if passwords are used, they can be determined by hackers. In the Internet, there are clients (typically personal computers with computer programs) and servers (server computers running computer programs that cause them to provide services to the clients). Typically computer programs used at clients and servers assume that their users are honest about their identity. Some client/server applications rely on the client to restrict its activities to those which it is allowed to do, with no other enforcement by the server. Strong authentication is highly desirable for transactions involving money, confidential data or both.

One way to improve the situation is to use dedicated authentication protocols and, if necessary, encryption protocols for verifying the authenticity of a party and for preventing unauthorised parties from obtaining access. In addition, these protocols can typically be used to verify the integrity of any information exchanged over a link so that a recipient can be certain that the data received have not been tampered with.

Kerberos is a protocol designed to provide strong authentication for client/server applications by using secret-key cryptography. At least two versions of Kerberos have been described, versions 4 and 5. The version 5 Kerberos has been described by J. Kohl and C. Neuman in "The Kerberos Network Authentication Service (Version 5)", RFC 1510, September 1993. Versions 4 and 5 have also been described by W. Stallings, "Cryptography and Network Security, Principles and Practice", 2nd edition, p. 323-340. These two versions of Kerberos are briefly described in the following passages.

Figure 1:
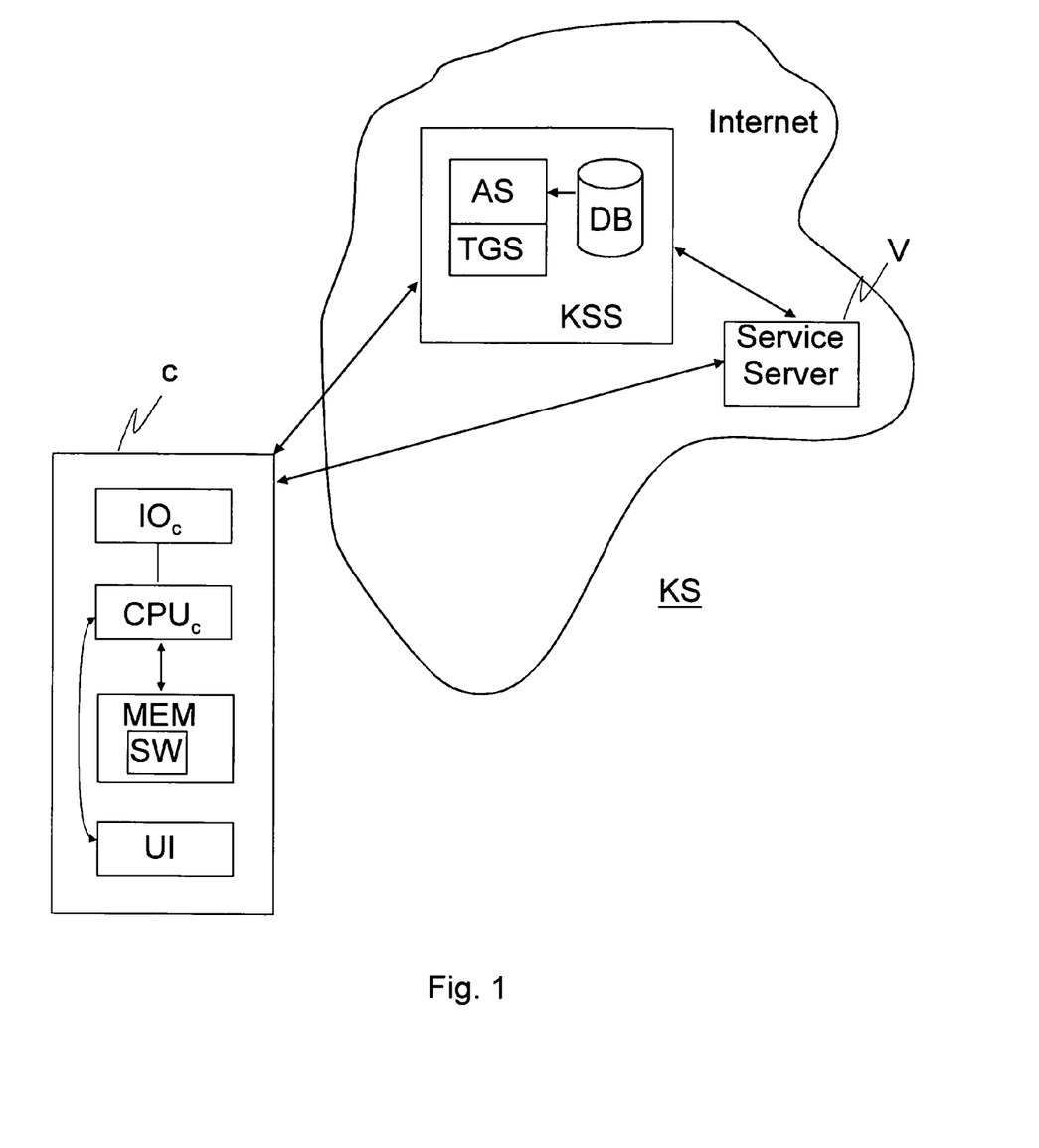
FIG. 1 shows an overview of a Kerberos system according to Kerberos version 4.

FIG. 1 shows an overview of a Kerberos system KS according to Kerberos version 4. The Kerberos system KS comprises a client c which can obtain access to the Internet, a Kerberos server KSS in the Internet and a service server V for providing a service for which authentication is required. The Kerberos server KSS comprises an authentication server AS, a ticket-granting server TGS, and a database DB comprising (hashed) passwords of different clients. The client c contains a personal computer (PC), comprising an Input/Output module $IO_c$ (such as a modem or a network adapter) for connecting to the Internet, a central processing unit $CPU_c$ for processing data and a memory $MEM_c$. The memory has a non-volatile portion for storing applications for controlling the $CPU_c$ and a random access memory portion for use in processing data. Additionally, the client c has a user interface UI for interacting with a user. The UI may prompt a user to give a password and may receive the password. In a Kerberos system, the applications together with the personal computer form the client c that can use services of a host (computer) accessible through an insecure network.

The V is a server that provides service to the client c. It authenticates the client c by using a sequence of authentications, in which the client c is first authenticated to the AS to obtain a ticket granting ticket $ticket_{tgs}$. Using the $ticket_{tgs}$ the client c can next obtain a service granting ticket $ticket_v$. This ticket can then be used for the service. This procedure will be explained in detail with reference to FIGS. 1 and 2.

In order to work, the Kerberos system should already have a first shared secret (or first authentication key, $K_c$) known by the client c, the AS and the TGS. A second shared secret ($K_v$) should be known by the AS, the TGS and the service server V, but not by the client c. These shared secrets are presumed to exist.

For any particular secret to be known by any particular party it is sufficient that the party can, when necessary, obtain the secret, for example by asking the user (party being a client) or by requesting it from the database (party being an AS or TGS). Typically, the TGS and AS are co-located, but in some cases the Kerberos server KSS can also be distributed so that the TGS and AS are not co-located.

Figure 2:
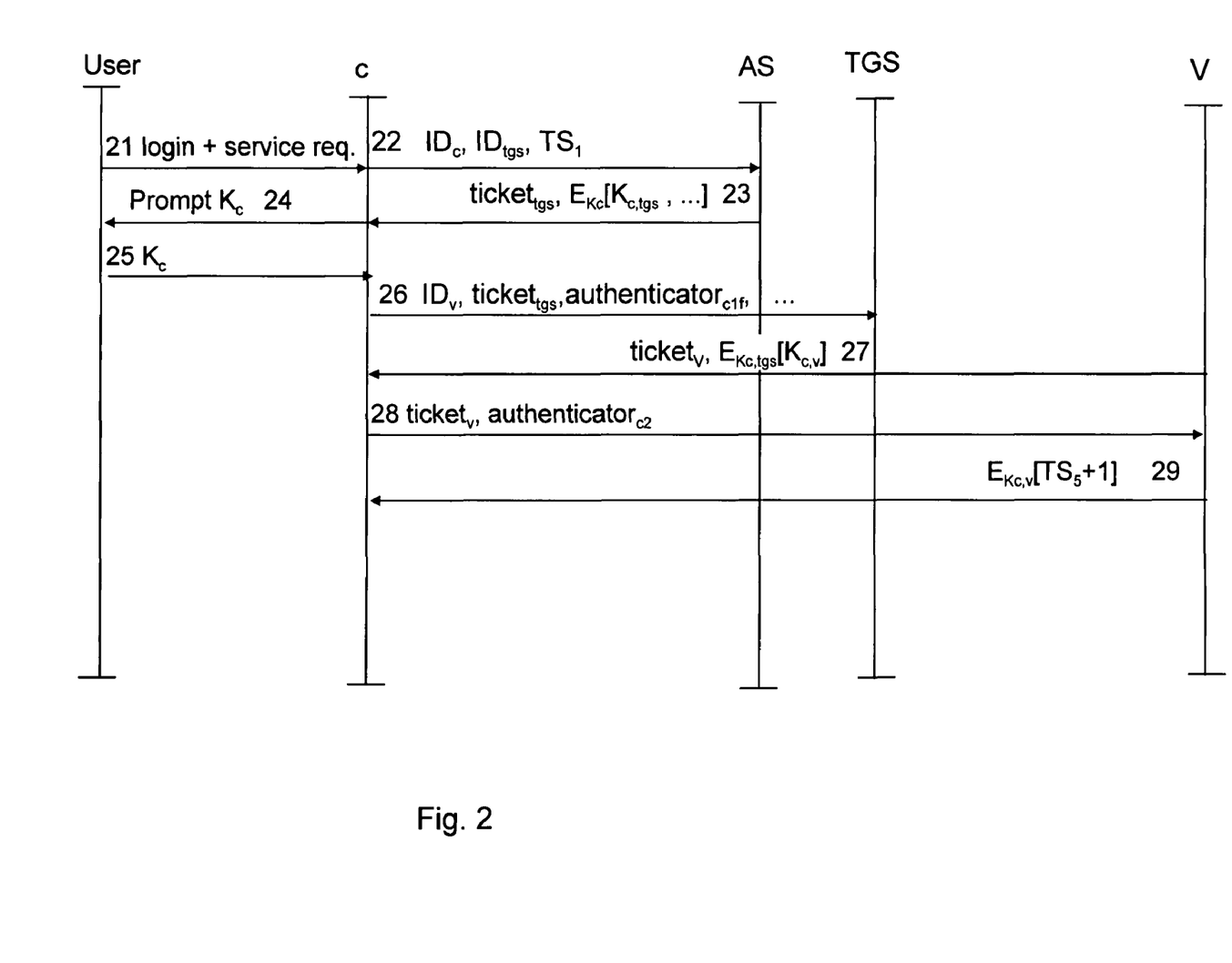
FIG. 2 shows the operation of the Kerberos system of FIG. 1.

Operation of the Kerberos system KS as a sequence of steps is illustrated in FIG. 2. In brief, FIG. 2 shows messaging between the user, client c, authentication server AS, ticket granting server TGS and service server V. For convenience, the notation here will follow that used in the above mentioned publication of Stallings. The steps of FIG. 2 will now be described.

Step 21: The user logs on to the client c and requests a desired service on the service server (host) by sending a login and a service request. To log on, the user enters a client's password $K_c$ that is known by him and the authentication server. The client's password is the first shared secret. From now on, $K_c$ is referred to as a first authentication key.

Step 22: The client c sends to the AS a request for a ticket granting ticket $ticket_{tgs}$. The request comprises the ID of the client c ($ID_c$), the ID of the TGS ($ID_{tgs}$), and a first time stamp $TS_1$ corresponding to the time when the request was sent.

Step 23: The AS forms a $ticket_{tgs}$ using a second authentication key $K_{tgs}$ known by the AS and the TGS but not by the client c. The $ticket_{tgs} = E_{K_{tgs}}[K_{c,tgs}\|ID_c\|AD_c\|ID_{tgs}\|TS_2\|Lifetime_2]$. E represents an encryption algorithm using a second authentication key $K_{tgs}$ as its encryption key. $K_{c,tgs}$ is a first session key formed by the AS (for example, a random key) for use between the client c and the TGS. $AD_c$ is the address of the client c, $ID_{tgs}$ is an identity of the TGS, $TS_2$ is second time stamp showing the time of the issue of the $ticket_{tgs}$ and $Lifetime_2$ is the time of expiry of the $ticket_{tgs}$. The bars "||" indicate concatenation. The $ticket_{tgs}$ is to be used later for obtaining service granting tickets ($ticket_v$) for using various services. Then the AS encrypts data using the $K_c$ as follows: $E_{K_c}[K_{c,tgs}\|ID_{tgs}\|TS_2\|Lifetime_2]$ and sends the $ticket_{tgs}$ and the encrypted data to the client c.

Step 24: The client c then prompts for the $K_c$ from its user. The user should know the $K_c$.

Step 25: The user provides the client c with the $K_c$.

Step 26: Using the $K_c$ and the $K_{c,tgs}$, the client c decrypts the encrypted data received from the AS and forms a first client authenticator, authenticator$_{c1}$=E$_{K_{c,tgs}}$ [ID$_c$||AD$_c$||ID$_V$||TS$_3$]. ID$_V$ is the ID of the V and TS$_3$ is the time of forming the authenticator$_{c1}$. As a skilled reader will understand, the client c is only able to derive the K$_{c,tgs}$ if it knows the K$_c$. The authenticator$_{c1}$ is later used by the TGS to authenticate the client c. The client c then sends a request for a service granting ticket (ticket$_V$) to the TGS. The request contains ID$_V$, ticket$_{tgs}$ and authenticator$_{c1}$.

Step 27: The TGS forms the ticket$_V$ and sends it together with an encrypted second session key K$_{c,V}$ to the client c. The second session key is encrypted with the first session key K$_{c,tgs}$. The ticket$_V$ is formed by the TGS using the knowledge of a second shared secret K$_V$ of the V, as follows: ticket$_V$=E$_{K_V}$ [K$_{c,V}$||ID$_c$||AD$_c$||ID$_V$||TS$_4$||Lifetime$_4$], wherein:

K$_{c,V}$ is a second session key for use between the client c and V,

TS$_4$ is a time stamp showing the time of forming the ticket$_V$, and

Lifetime$_4$ sets the lifetime of the ticket$_V$ to prevent replay attacks after the expiry of the lifetime of the ticket$_V$.

Step 28: The client c sends a service request to the V. The request contains the ticket$_V$ and a second client authenticator, authenticator$_{c2}$, wherein authenticator$_{c2}$=E$_{K_{c,V}}$ [ID$_c$||AD$_c$||TS$_5$]. TS$_5$ is a time stamp showing the time of forming the second client authenticator.

Step 29: After the service server V has examined the authenticator$_{c2}$, it can authenticate itself to the client c for mutual authentication. This is done by replying with the TS$_5$, incremented by 1 and encrypted with the K$_{c,V}$, so that the client c can trust that V is the correct server since it can encrypt with the same K$_{c,V}$. The reply is thus E$_{K_{c,V}}$[TS$_5$+1].

The steps 22 and 23 occur once for each user logon session. The ticket$_{tgs}$ is thus valid for the duration of the user logon session (or until it expires). The steps 26 and 27 occur once for each type of service. In other words, for each type of service, a different ticket$_V$ is applied for and is granted. The steps 28 and 29 occur once for each service session of a granted service type.

The description of FIG. 2 illustrates how Kerberos can provide centralised authentication to a plurality of different service servers that trust the Kerberos server KSS (the combination of AS and TGS). The KSS has a different second shared secret K$_V$ with each V and each V is registered with the KSS.

The system of FIG. 1 represents one realm: For example, a single employer in one country or city owns all the entities.

Kerberos version 5 provides some refinements over version 4, including allowing a plurality of Kerberos realms to interoperate so that one authentication server AS can grant service granting tickets ticket$_V$ to service servers V of different authentication realms.

The operation of a Kerberos system according to Kerberos version 5 will next be described with reference to FIG. 1. In Kerberos version 5, the authentication and key distribution starts with an Authentication Service Exchange procedure, where the client c requests a ticket$_{tgs}$ from the AS, and the AS forms and sends the ticket$_{tgs}$ and other parameters encrypted with the K$_c$ in response. The ticket$_{tgs}$ and the K$_{c,tgs}$ key will be used as credentials for obtaining service granting tickets (ticket$_V$) for using services. The Authentication Service Exchange is as follows:

(1) from c to AS message KRB_AS_REQ=Options||ID$_c$||Realm$_c$||ID$_{tgs}$||times||Nonce$_1$ (2) from AS to c, message KRB_AS_REP=realm$_c$||ID$_c$||ticket$_{tgs}$||E$_{K_c}$ [K$_{c,tgs}$||times||nonce$_1$||realm$_{tgs}$||ID$_{tgs}$]

where ticket$_{tgs}$=E$_{Ktgs}$[flags||K$_{c,tgs}$||realm$_c$||ID$_c$||AD$_c$||times]

and wherein options various options used to request that certain flags be set in the returned ticket flags various message flags for use in the Kerberos version 5 protocol realm$_c$ realm of the client realm$_{tgs}$ realm of the TGS times start time, expiration time and renewal time of the ticket$_{tgs}$ nonce$_1$ a random value generated by the client to ensure that the response is fresh (not a copy of an earlier response)

One should bear in mind that different types of fields may be encrypted together, because all the different types are ultimately represented by binary codes (zeros and ones), which can be operated within the same function regardless their origin.

The K$_c$ is used to encrypt the K$_{c,tgs}$ and other parameters in the KRB_AS_REP message. It should be noted that in Kerberos, anyone can request a ticket$_{tgs}$ but only the valid client is able to use it. Because only the valid client knows the K$_c$, others are not able to decrypt the K$_{c,tgs}$ which is required when using the ticket$_{tgs}$. In Kerberos, the K$_c$ is only used in the KRB_AS_REP message to encrypt the K$_{c,tgs}$ and other parameters. Different session keys are used instead of the K$_c$ in all other Kerberos messages.

With the ticket$_{tgs}$ and K$_{c,tgs}$, the client c is able to obtain new versions of ticket$_V$ and K$_{c,V}$ from the TGS. The new versions can further be used to obtain service from the Vs.

Authentication may also be needed in mobile communications networks. At present, there are various types of mobile communications networks, with different types of authentication procedures. Typically, digital mobile communications networks, such as GSM, provide digital authentication of a subscriber in order to support invoicing of the a network operator running the network. In GSM, the authentication is based on using GSM triplets, which are generated by dedicated Subscriber Identity Modules (SIM) at a subscriber's end and at an Authentication Centre (AuC) of the network operator. The AuC is typically functionality provided by a Home Location Register (HLR) of a GSM network. In GSM, the GSM triplets can be used in a rather relaxed way, so that their order is not strictly fixed. In the forthcoming Universal Mobile Telecommunications System (UMTS) the authentication differs from GSM. An overview of the authentication in UMTS is given in the 3rd Generation Partnership Project (3GPP) Technical Specification (TS) 33.102 V3.6.0 (2000-10), paragraph 6.3, and abstracted in the following:

In UMTS, the user authentication modules are referred to as UMTS subscriber identity modules (USIMs) and the AuC generates authentication vectors, or quintets, which comprise the following components: a random number RAND, an expected response XRES, a cipher key CK, an integrity key IK and an authentication token AUTN. Each authentication vector is good for one authentication. RAND, XRES and CK roughly correspond to RAND; SRES and Kc of GSM, but particularly AUTN and its use form a significant difference over GSM. The AUTN is based, among others, on a sequence number SQN corresponding to a particular authentication vector.

WO00/02406 provides a method, which allows clients in a mobile IP (IP, Internet Protocol) network to generate a K$_c$ by using a Subscriber Identity Module (SIM) of a GSM operator. The GSM operators have databases containing the identities of subscribers and their secret data. In GSM, the secret stored on a SIM is referred to as Ki. The SIM has capability to generate a GSM session key K$_{gsm}$, a one-way hashed signed response SRES of a challenge RAND based on the secret Ki. This procedure of WO00/02406 is shown as a series of steps 31 to 37 in FIG. 3.

Figure 3:
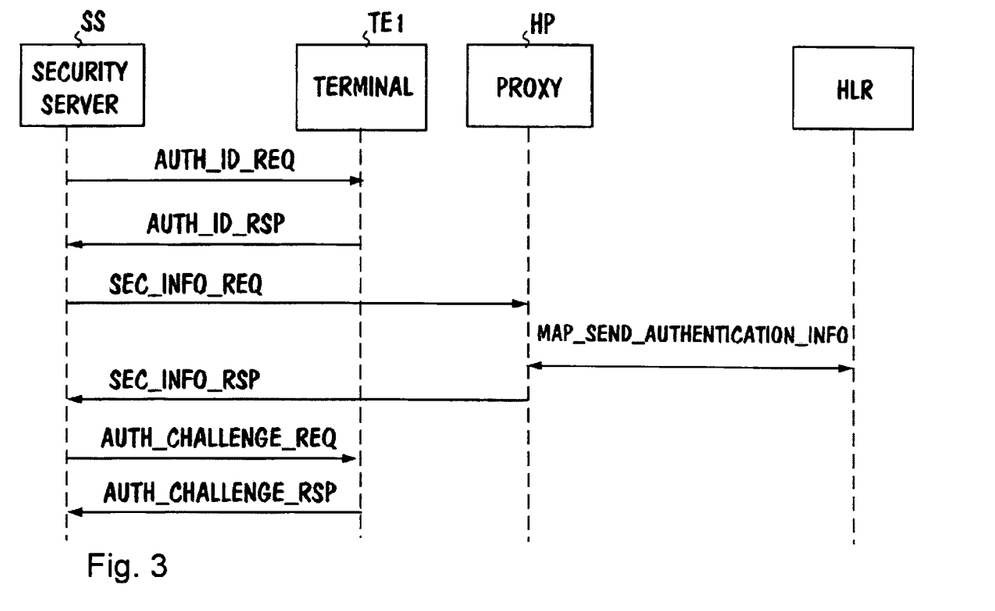
FIG. 3 shows an authentication procedure of WO 0002406.

A security server SS (corresponding to a KSS) sends (step 31) an authentication ID request to a terminal TE1 (corresponds to a client c). The client c responds (step 32) by its International Mobile Subscriber Identity (IMSI). The security server sends (step 33) a security information request to a proxy server. The proxy server acquires (step 34) the security information from a Home Location Register of a GSM operator whose SIM is being used, containing a GSM triplet ($K_{gsm}$, RAND and challenge). The proxy server sends (step 35) the GSM triplet to the security server. The security server sends (step 36) the challenge RAND to the client c.

Step 37: The client c forms its own version of the GSM session key $K_{gsm}$ and SRES corresponding to its Ki and the RAND received. Then the client c sends back the SRES so that the security server can compare it against the SRES it received in the GSM triplet from the proxy server. If the SRES provided by the proxy server and the SRES generated by the client c match, a positive authentication is made and the security server can start using the GSM session key $K_{gsm}$ as the $K_c$ between the client c and a security server (that is, a Kerberos server).

WO00/02406 combines GSM technology with Kerberos technology. Instead of authenticating a wireless mobile telephone by a GSM network by using the GSM triplets and comparing different responses against each other, the SIM is used for generating a response to a challenge received from a mobile IP network. The response is then sent to the mobile IP network for comparison against the correct answer for the Ki and RAND for detecting that the client c is genuine and is not trying to illegitimately access services using an IMSI of another client.

SUMMARY

According to a first aspect of the invention there is provided a method of authenticating a client, comprising the steps of:
sending client identity information to an authentication block;
obtaining at least one challenge and at least one first secret for the authentication block based on a client's secret specific to the client;
forming first credentials;
forming a first authentication key using the at least one first secret;
encrypting the first credentials using the first authentication key;
sending the at least one challenge and the encrypted first credentials to the client;
forming the first authentication key at the client;
decrypting the encrypted first credentials at the client using the first authentication key; characterised in that
the encryption of the first credentials are independent of the authentication block receiving any response based on the client's secret from the client.

The method of the first aspect can be understood as a client sending a request message to an authentication block and directly responsive to the request message, the client receives the encrypted first credentials containing an authenticating ticket and decrypts the first credentials using the secret specific to the client. This allows the client to obtain the first credential without an intermediate step of sending back to the authentication block any response based on the client's secret.

Preferably, the authentication block is located in a data communication network. Even more preferably, a network server provides the authentication block.

Preferably, the first credentials are encrypted before the authentication block receives any response based on the client's secret from the client.

Preferably, the encrypted first credentials are sent together with the at least one challenge to the client.

Even more preferably, no response based on the client's secret is sent from the client to the authentication block. Not sending any such response makes it further possible to use the entire first secret in forming the first authentication key, which cryptographically strengthens it.

Preferably, the challenge is a random code.

Preferably, the forming of the first authentication key is based on two or more first secrets. This further strengthens cryptographically the first authentication key.

The invented method is based on a new approach to a problem of creating a first shared secret between an authentication block and the client. In the invention, it has been realised that it is possible to form the first credentials, the first authentication key and to encrypt the first credentials with the first authentication key when the authentication block obtains the challenge and the first secret. Cryptography is used for both indirect authentication and for delivery of the first credentials. Only if the client has resolved the first authentication key correctly, it can decrypt the first credentials. The client can then form a service request message using cryptographically the first decrypted credentials and so it can become authenticated as a by-product of the forming the service request message. This provides significant advantages. The method allows secure and fast authentication, in which the first credentials are formed and then sent with the at least one challenge without need to first separately authenticate the client. This makes the method usable with various known authentication methods including the Kerberos versions 4 and 5 and also reduces the amount of communications signals which need to be sent and received. The method further makes it unnecessary for an authentication block to store the first secret after forming the first authentication key and the first credentials. This reduces the complexity of the authentication process and makes it quicker, because some messaging becomes redundant. The authentication is also stronger, if all the data contained by the first secret is used in forming the first authentication key. This was not possible in the prior art, where a signed response (SRES) was transmitted from the client to the authentication block as clear text so that any third party could have easily obtained it.

Preferably, the step of obtaining the at least one challenge and at least one first secret for the authentication block based on a client's secret specific to the client occurs before a need to authenticate the client. Even more preferably, a collection of challenges and first secrets sufficient for forming at least two first credentials for the client is obtained in a batch. Preferable still, such collection is obtained for a group of clients so that the authentication block has the data already available for authenticating any of the clients of the group without needing to first obtain them. This allows faster authentication of a group of clients belonging to the same organisation or group as the data relating to their client's secrets are already available to the authentication block and need not be separately obtained on each authentication of a client.

Preferably, the client identity information is subscriber identity. Even more preferably, the authentication block forms an identification for use in further authentication messages for the client so that the subscriber identifier need not be included in them.

Preferably, the first authentication key is formed using a hash function of at least one first secret. Even more preferably, the first authentication key is formed using a hash function of at least the first secret and the replay attack protector. The using of the replay attack protector in forming the first authentication key and the using of a hash function makes it possible for the authentication block to authenticate to the client.

In an alternative embodiment, the forming of the first authentication key is based on a part of a first secret Preferably, the forming of the first credentials comprises the sub-steps of:
  encrypting first information corresponding to the client with a second authentication key not known by the client; and
  verifying that the first information has been encrypted using the second authentication key.

Preferably, the method further comprises the step of generating a service request message using cryptographically the first decrypted credentials.

Preferably, the first information contains at least one of the items selected from a group consisting of: the identity of the client, the identity of the ticket granting server, the realm of the client, and a time stamp.

Preferably, the client is a multifunction mobile terminal having at least mobile telecommunications functionality and packet data network communications functionality. Even more preferably, the mobile telecommunications functionality supports the Global System for Mobile Communications. This provides a large base of already existing subscriber identity modules (SIMs) in use for authenticating the clients in different data communication networks other than the telecommunications networks.

Preferably, the mobile telecommunications functionality supports a telecommunications system wherein ordered authentication vectors are used.

Preferably, the at least one challenge and the at least one first secret correspond to particular at least one sequence number and convey the at least one sequence number, and the method further comprises the steps of:
  maintaining a sequence number counter at the client;
  obtaining at the client the sequence number using at least one of the at least one challenge and the at least one first secret; and
  checking at the client if the sequence number is in a correct range about the sequence number counter.

Preferably, the method further comprises the step of initiating sequence number synchronisation in case the sequence number is not in the correct range about the sequence number counter.

Preferably, the initiating sequence number synchronisation comprises a step of forming a synchronisation request message containing at least one challenge out of the at least one challenge.

Preferably, the initiating sequence number synchronisation comprises a step of forming a synchronisation request message containing at the sequence number counter.

Preferably, the synchronisation request message further comprises a message authentication code.

Preferably, the checking the first credentials is based on the sequence number and comprises the steps of maintaining a sequence number counter by the client; and determining whether at least one parameter of the first credentials have been computed using the sequence number. Preferably the determining whether at least one parameter of the first credentials have been computed using the sequence number is based on the sequence number and an exclusive or operation.

According to a second aspect of the invention there is provided a method of authenticating a client, comprising the steps of:
  sending client identity information to an authentication block;
  receiving by the client at least one challenge and encrypted first credentials from the authentication block;
  forming at the client a first secret based on a client's secret and the challenge;
  forming a first authentication key at the client by using the first secret; and
  decrypting the first authentication key at the client using the encrypted first credentials;
  characterised in that
  the decryption of the encrypted first credentials are independent of sending any response based on the client's secret from the client to the authentication block.

According to a third aspect of the invention there is provided a method of authenticating a client, comprising the steps of:
  receiving by an authentication block client identity information from a client;
  obtaining for the authentication block at least one challenge and at least one first secret based on a client's secret specific to the client;
  forming first credentials;
  forming a first authentication key using the at least one first secret;
  encrypting the first credentials using the first authentication key;
  sending the at least one challenge and the encrypted first credentials to the client;
  receiving from the client a message containing a first information; and
  checking if the first credentials have been used to cryptographically process the first information;
  characterised in that
  the encryption of the first credentials is independent of the authentication block receiving any response based on the client's secret from the client.

According to a fourth aspect of the invention there is provided a method of authenticating a client, comprising the steps of:
  sending client identity information to an authentication block;
  obtaining at least one challenge and at least one first secret by the authentication block based on a client's secret specific to the client;
  forming first credentials;
  forming a first authentication key using the at least one first secret;
  encrypting the first credentials using the first authentication key by the authentication block;
  sending the at least one challenge and the encrypted first credentials to the client by the authentication block;
  forming the first authentication key at the client;
  decrypting the encrypted first credentials at the client using the first authentication key; and
  authenticating the client by using the first credentials.

According to a fifth aspect of the invention there is provided an authentication system, comprising an authentication block and a client; and:
  a first input at the authentication block for receiving client identity information;

a second input at the authentication block for receiving at least one challenge and at least one first secret based on a secret specific to the client;
a first processor at the authentication block
for forming first credentials;
for forming a first authentication key using the at least one first secret; and
for encrypting the first credentials using the first authentication key;
an output at the authentication block for providing the at least one challenge and the encrypted first credentials to the client; and
a first processor at the client for forming the first authentication key and for decrypting the encrypted first credentials using the first authentication key;
characterised in that
the encryption of the first credentials is independent of the authentication block receiving any response based on the client's secret from the client According to a sixth aspect of the invention there is provided a client to an authentication system comprising an authentication block; the client comprising:
a first output for providing the authentication block with a client identity information;
a first input for receiving at least one challenge and encrypted first credentials;
a first processor
for forming a first secret based on a client's secret and the challenge;
for forming a first authentication key by using the first secret; and
for decrypting the encrypted first credentials using the first authentication key;
characterised in that
the decryption of the encrypted first credentials is independent of sending any response based on the client's secret from the client to the authentication block.

According to a seventh aspect of the invention there is provided an authentication block for an authentication system comprising a client; the authentication block comprising:
a first input for receiving client identity information;
a second input for receiving at least one challenge and at least one first secret based on a secret specific to the client;
a first processor
for forming first credentials;
for forming a first authentication key using the at least one first secret; and
for encrypting the first credentials using the first authentication key;
an output for providing the client with the at least one challenge and the encrypted first credentials;
the first input being further adapted to receive from the client a message containing a first information; and
the first processor being further adapted to check if the first credentials have been used to cryptographically process the first information;
characterised by in that
the encryption of the first credentials is independent of the authentication block receiving any response based on the client's secret from the client.

According to an eighth aspect of the invention there is provided a computer program product for controlling a client; the computer program product comprising:
computer executable code to enable the client to send client identity information to an authentication block;
computer executable code to enable the client to receive from the authentication block at least one challenge and encrypted first credentials;
computer executable code to enable the client to form a first secret based on a client's secret and the challenge;
computer executable code to enable the client to form a first authentication key by using the first secret; and
computer executable code to enable the client to decrypt the encrypted first credentials using the first authentication key;
characterised by in that
the decryption of the encrypted first credentials are independent of sending any response based on the client's secret from the client to the authentication block.

According to a ninth aspect of the invention there is provided a computer program product for controlling an authentication block in order to enable the authentication block to authenticate a client, the computer program product comprising:
computer executable code to enable the authentication block to receive client identity information from a client;
computer executable code to enable the authentication block to obtain at least one challenge and at least one first secret based on a secret specific to the client;
computer executable code to enable the authentication block to form first credentials;
computer executable code to enable the authentication block to form a first authentication key using the at least one first secret;
computer executable code to enable the authentication block to encrypt the first credentials using the first authentication key;
computer executable code to enable the authentication block to send the at least one challenge and the encrypted first credentials to the client;
computer executable code to enable the authentication block to receive from the client a message containing first information; and
computer executable code to enable the authentication block to check if the first credentials have been used to cryptographically process the first information;
characterised by in that
the encryption of the first credentials are independent of receiving any response based on the secret specific to the client from the client.

The embodiments of one aspect also apply to various other aspects of the invention. In sake of brevity, the embodiments have not been repeated in connection with every aspect of the invention. A skilled reader will appreciate the advantages of the various aspects based on the advantages of the first aspect of the invention.

BRIEF DESCRIPTION OF THE DRAWINGS

The invention will now be described, by way of example only, with reference to the accompanying drawings, in which.

DETAILED DESCRIPTION

FIGS. 1 to 3 have been described in the foregoing.

Figure 4:
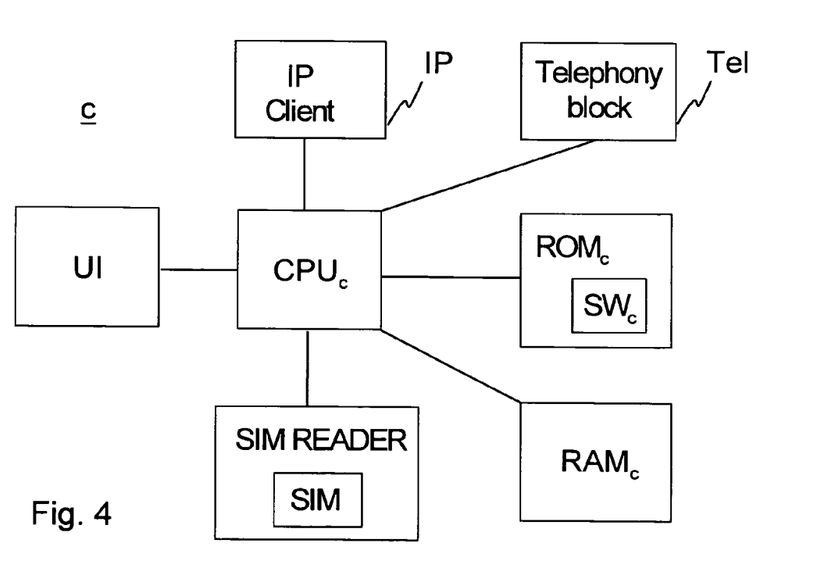
FIG. 4 is a block diagram showing a client according to a preferred embodiment of the invention.

FIG. 4 is a block diagram showing a client c according to a preferred embodiment of the invention. The client c comprises a telephony functionality block Tel, an IP terminal functionality block IP for connecting to an IP network, a non-volatile memory ROM, a random access memory $RAM_c$, a user interface $UI_c$, a SIM reader with a SIM therein, software $SW_c$ stored in the $ROM_c$, and a central processing unit $CPU_c$ for running the software$_c$ and controlling the operation of the client c accordingly. The telephony functionality block Tel provides conventional telephony functionality such as making telephone calls and modern communication functionality such as making data calls, sending or receiving facsimiles, e-mails. Typically, the Tel is compatible with the GSM phase 2+. It may further support the General Packet Radio Service (GPRS), which is a packet based communications service built on GSM. In that case, the client c supports two different kinds of packet data networks. The operation of the client c will be described in detail with reference to FIG. 6.

Figure 5:
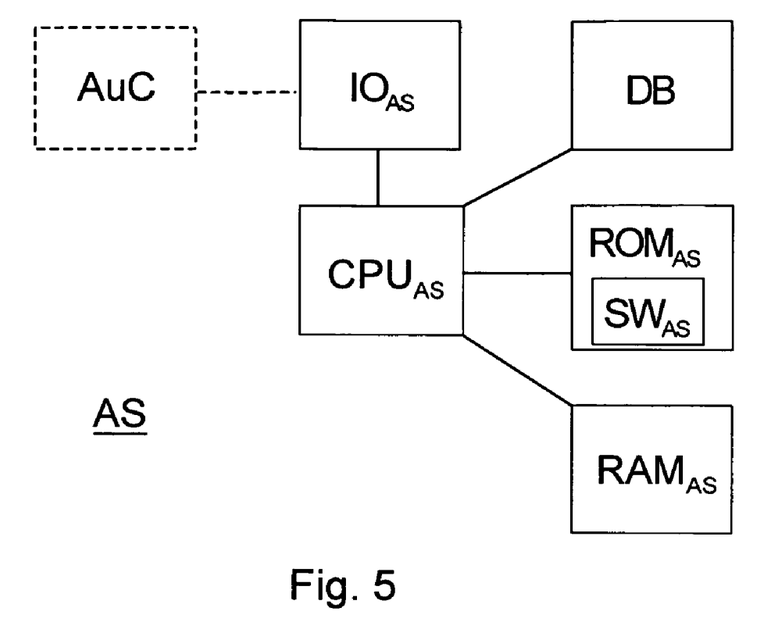
FIG. 5 is a block diagram showing an authentication server according to the preferred embodiment of the invention.

FIG. 5 shows a block diagram of an authentication server AS according to the preferred embodiment of the invention. The authentication server AS comprises an Input/Output block $IO_{AS}$, a key database (possibly geographically distributed) DB for storing pass keys as such or as hashed, a non-volatile memory $ROM_{AS}$; a random access memory $RAM_{AS}$, software $SW_{AS}$ stored in the $ROM_{AS}$, an access to an Authentication Centre AuC of a telecommunication network (typically of a GSM network), and a central processing unit $CPU_{AS}$ for running the software$_{AS}$ and controlling the operation of the AS accordingly. The operation of the authentication server will be described in detail with reference to FIG. 6.

Figure 6:
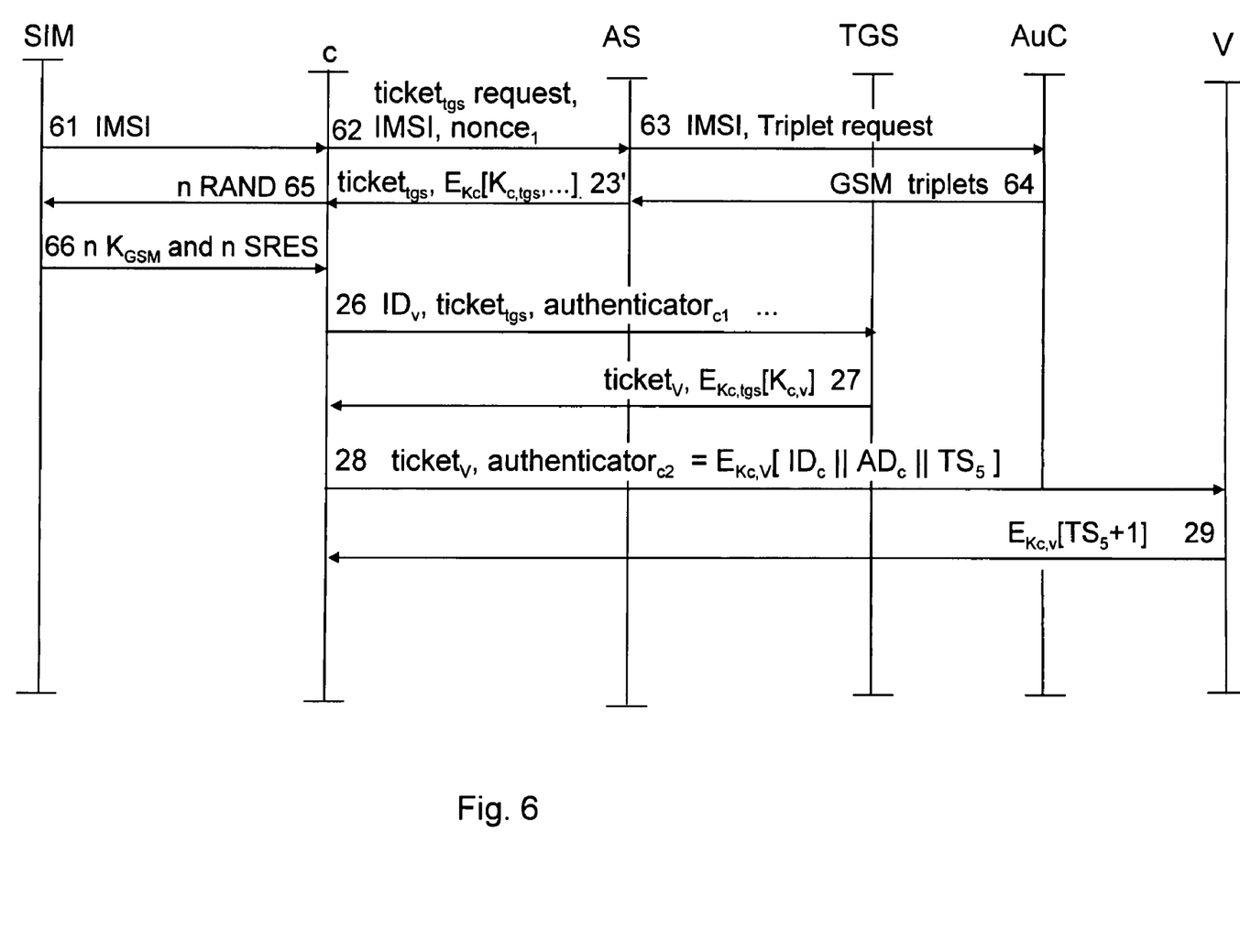
FIG. 6 shows the operation of a Kerberos system modified according to a preferred embodiment of the invention.

FIG. 6 shows the operation of a Kerberos system modified according to the preferred embodiment of the invention. The system comprises the client c of FIG. 4 and the authentication server AS of FIG. 5. Corresponding reference numerals have been applied to corresponding messages and steps described in relation to FIGS. 1 and 2. The steps will now be described.

Step 61: The SIM provides the International mobile subscriber identity (IMSI) of a telecommunications network subscriber (whose SIM it is) to a client c (mobile node, the ID of the TGS ($ID_{tgs}$), and a first time stamp or a random number (as a replay attack protector, or nonce$_1$) corresponding to the time when the request was sent.

Step 62: The client c sends a KRB_AS_REQ message, that is, a ticket$_{tgs}$ request, comprising the IMSI, the $ID_{tgs}$ and the nonce$_1$ to the AS.

Step 63: The AS requests for n (one or more) GSM triplets from an AuC of the mobile telecommunications network that is identified by the IMSI. These triplets are formed using a cryptographic function and subscriber's secret known both by the SIM and the AuC.

Step 64: The AuC replies with one or more sets of challenges (RAND) and GSM session keys ($K_{gsm}$) and typically also corresponding signed responses (SRES). The AS forms a first authentication key $K_c$ using the n GSM session keys $K_{gsm}$ and/or signed responses SRES of the GSM triplets as follows: $K_c$=hash$_1$[n×$K_{gsm}$, n×SRES, nonce$_1$], wherein hash$_1$ is a first hash function, which is a one-way hash function known both by the client c and the AS. x is a notation of n $K_{gsm}$ parameters, not of a multiplication. According to the preferred embodiment of the invention, the signed responses are not compared at all (and therefore not transmitted in clear text) so that the received SRESs can also be used in forming the $K_c$. Use of more secret data in forming the $K_c$ increases its cryptographic strength. Alternatively, only GSM session keys $K_{gsm}$ or signed responses SRESs can be used. Furthermore, in generating the first authentication key $K_c$ the number of GSM session keys $K_{gsm}$ used may differ from the number of SRESs used. It is only necessary for the client c to know how the $K_c$ is generated. The $K_c$ will serve in authentication between the AS and the client c. Furthermore, a first session key $K_{c,tgs}$ is formed by the AS. The $K_{c,tgs}$ can be, for example, a random key generated by the AS.

Step 23': The AS forms a ticket granting ticket ticket$_{tgs}$ as has been described in the foregoing in relation to the prior art section. Step 23' differs from step 23 described in the prior art section so that the AS sends also the n RANDs that have been used in generating the $K_c$ in addition to the ticket$_{tgs}$ and the $K_{c,tgs}$ encrypted with the $K_c$. The message sent from the AS to the c in step 23' can be referred to as a KRB_AS_REP message.

Step 65: The client c gives the n RANDs to the SIM, which forms corresponding n pairs of SRES and $K_{gsm}$ values.

Step 66: The SIM gives the n pairs of SRES and $K_{gsm}$ values formed in the previous step to the client c. Next, the client c forms an own version of the $K_c$ using the SRES and the $K_{gsm}$ values in a similar fashion that the AS had earlier done. After having its own version of the $K_c$, the operation of the system then follows steps 26 to 29 of the standard Kerberos version 5 protocol explained in the foregoing with reference to FIG. 2.

Steps 24 and 25 are replaced by steps 65 and 66, because the authentication can take place automatically if the user has accepted access to his SIM.

As mentioned in the foregoing, the IMSI is sent from the client c to the AS and then RANDs are sent from the AS to the client c. This messaging can implemented in various manners, among which the implementation according to the preferred embodiment is next described.

Kerberos version 5 authentication service exchange comprises an initial transmission of optional pre-authentication data (PA_DATA) from the client c to the AS. The presence of the pre-authentication data is shown in a flag PRE-AUTHENT. The use of PA_DATA is not standardised but, according to Stallings, "the MIT implementation of version 5 has encrypted timestamp pre-authentication block containing a random confounder, a version number, and a timestamp, encrypted in the client's password-based key". The "pre-authentication block", or data, is then decrypted by the AS. The AS can then verify the true authenticity of the client c and send tickets only if the pre-authentication will be confirmed. Stallings continues by describing another possibility that utilises a smart card that generates a series of passwords each having its own limited period of validity. The passwords can be based on the user's password, but as they change, the passwords transmitted are in effect arbitrary and are difficult to determine. Use of a smart card reader can be indicated by a HW_AUTHENT flag, which identifies the protocols which require use of hardware that is expected to be only in the possession of the correct client c.

In the preferred embodiment of the invention, the PA_DATA and HW_AUTHENT flags are utilised in the present invention so that the IMSI can be transmitted in the PA_DATA field and the HW_AUTHENT flag can be used to indicate the use of a SIM for authentication. Instead of using the PA_DATA for any pre-authentication, the AS requests, responsive to a dedicated value of the HW_AUTHENT flag, GSM triplets from the AuC of the subscriber. The correct AuC is found by using the IMSI.

The AS sends the n RANDs to the client c in a standard Kerberos version 5 message KRB_AS_REP, in a pre-authentication data (PA_DATA) field. After receiving the RANDs, the client c can form its own version of the $K_c$ and decrypt the $K_{c,tgs}$.

In the preferred embodiment, the PA_DATA field is used for sending the IMSI from the client c to the AS. As the client's ID $ID_c$, a fake $ID_c$ that is not the true ID of the client (for example a random value or a constant such as zero), is used as the $ID_c$. The (fake) $ID_c$ is embedded in all the following authentication messages in which tickets are requested or granted. As an advantage of sending the IMSI in the PA_DATA field, the IMSI will not become part of a series of further messages. This is good since the IMSI identifies the subscriber. For security reasons, it is desirable to limit its general availability. Use of a pre-authentication flag and data fields is also advantageous, in order to provide a standardised way to indicate to the AS that a method of using a SIM-authentication according to the invention is being used. Standard Kerberos version 5 can be used with small changes and no proprietary protocols need to be run first in order to obtain the first session key $K_{c,tgs}$ for use in the Kerberos version 5 protocol.

It was also mentioned in the previous paragraph that the client's ID $ID_c$ can be given an arbitrary value. Furthermore, the $ID_c$ can be chosen later on by the AS. The $ID_c$ is sent back from the AS as cleartext so that it does not matter if the $ID_c$ changes after the client c has sent the first message with an arbitrary initial $ID_c$. It is advantageous for the AS to choose the $ID_c$ because it provides an opportunity for centralised allocation of identities so that each identity can be unique during its life-time.

Figure 7:
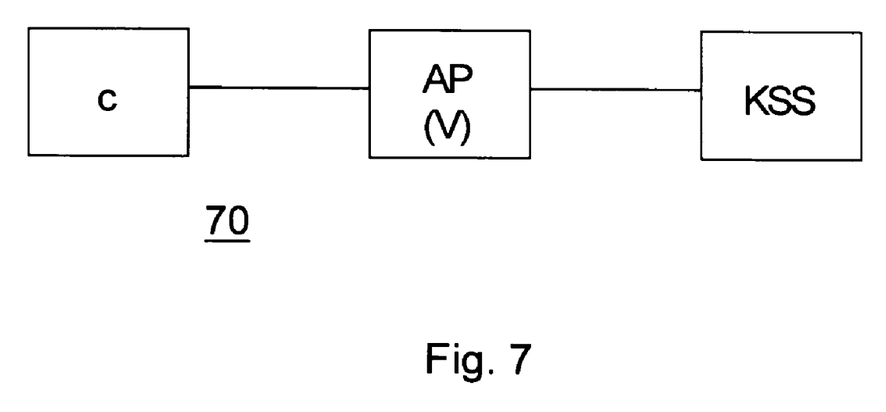
FIG. 7 shows a block diagram of a Wireless Local Area Network authentication system according to an embodiment of the invention.

FIG. 7 shows a block diagram of a Wireless Local Area Network authentication system 70 according to an embodiment of the invention. The system 70 comprises a client c, an access point AP, a Kerberos key distribution centre KSS containing both a Kerberos Authentication Server (AS, not shown in FIG. 7) and a Ticket-Granting Server (TGS, not shown in FIG. 7). The AP functions as a proxy server between the client c and the KSS, as will next be illustrated with reference to FIG. 8. Additionally, the AP contains Kerberos Service Server (V, not shown in FIG. 7) functionality.

Figure 8:
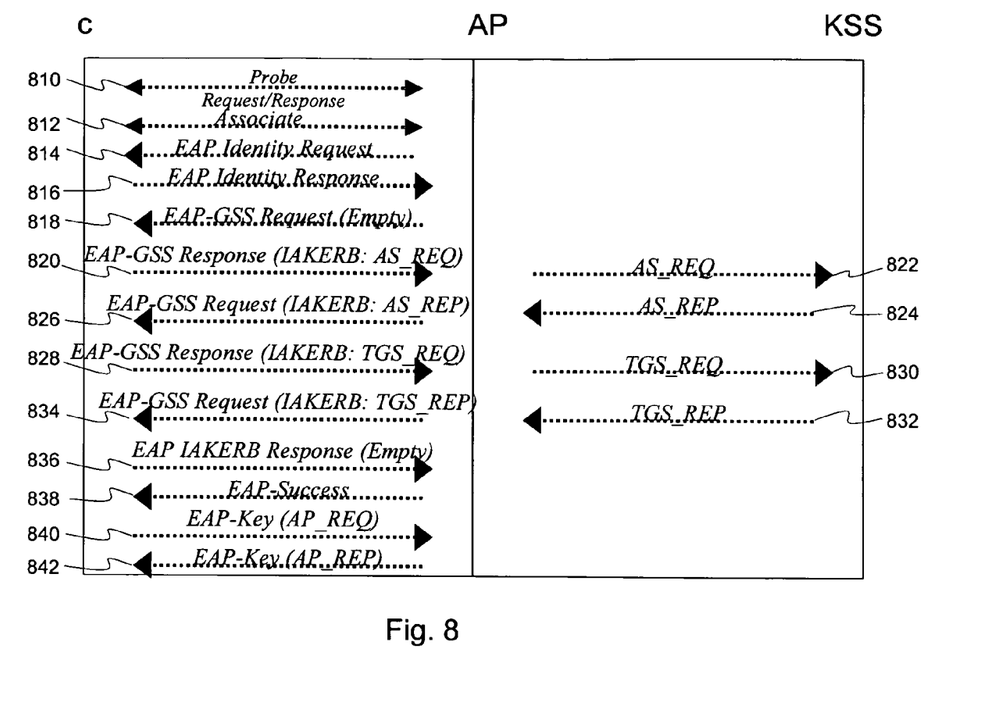
FIG. 8 shows an authentication procedure of the authentication system of FIG. 7.

FIG. 8 shows an authentication procedure of the authentication system 70 of FIG. 7. The procedure starts from steps 810 and 812, in which the AP sends advertisements informing the client c about itself and the client c associates with the AP. Next, an Extensible Authentication Protocol (EAP) identity request message is sent by the AP (step 814) to the client c. The client c replies with an EAP Identity Response (step 816). The AP then sends an EAP-GSS Request (step 818) to the client c. All these steps 810 to 816 are familiar to a person skilled in the art, for example from a publication "TGe Security Baseline", November 2000, by D. Halasz, S. Norman, G. Zom, B. Aboba, T. Moore, J. Walker, B. Beach, B. O'Hara, slide 18, (IEEE 802.11-001419).

Next, the client c forms (step 820) a message AS_REQ, which corresponds to the KRB_AS_REQ explained in the foregoing and then the client c sends the message to the AP encapsulated by IAKERB and further EAP-GSS protocols. Both IAKERB and EAP-GSS protocols are known to a person skilled in the art, see for example "Generic Security Service Application Program Interface, Version 2, Update 1" (RFC 2743), January 2000, by J. Linn and "Initial Authentication and Pass Through Authentication Using Kerberos V5 and the GSS-API (IAKERB)", November 2000, by M. Swift, J. Trostle, B. Aboba and G. Zom (draft-ietf-cat-iakerb-05.txt).

The AP forwards (step 822) the AS_REQ message to the KSS, which replies (step 824) with an AS_REP message to the AP. The AP forwards (step 826) the AS_REP encapsulated by the IAKERB and EAP-GSS protocols to the client c. The AS_REP corresponds to the KRB_AS_REP explained in the foregoing.

In steps 828 to 834 a ticket service granting ticket is requested and granted to the client c.

As was mentioned in description of FIG. 7, the AP has two roles. The AP operates as an IAKERB proxy when it forwards the clients AS_REQ/AS_REP and TGS_REQ/TGS_REP messages (steps 820 to 834). In addition, the AP contains a Kerberos Service Server (V), for example for providing access to a network, such as the Internet. In steps 828 to 834, the client c obtains a ticket, for the AP from the KSS. In steps 840 and 842 (AP_REQ and AP_REP), the client c uses the ticket, to obtain a service from a service server, for example an access to the Internet through the AP.

Typically, a separate session key will be used between the client and the access point (distributed in steps 840 to 842) and the SIM-generated key will only be used in the authentication service exchange.

In yet another alternative embodiment, the IMSI can be transmitted from the client c to the AP in the EAP Identity Response message (step 816), in which case it need not be transmitted in the AS_REQ message.

Figure 9:
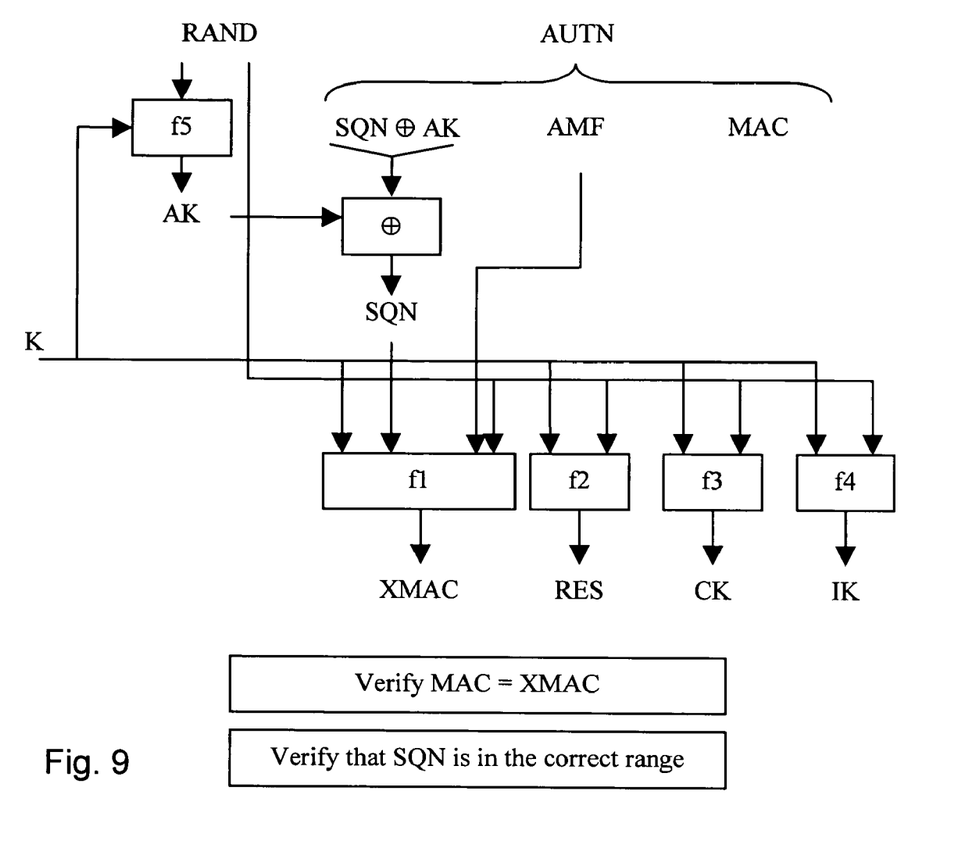
FIG. 9 shows an authentication procedure at the client according to yet another embodiment of the invention.

FIG. 9 shows an authentication sub-procedure at the client according to yet another embodiment of the invention. In this embodiment the client has a UMTS SIM USIM instead of a GSM SIM. On describing the process at the client the process at the network end becomes also clear to a skilled person. The sub-procedure corresponds to the UMTS Authentication and Key Agreement (AKA) procedure and is used to obtain the UMTS quintet. The UMTS quintet contains 5 data items: a challenge RAND, an expected response XRES that should match with a response RES that the USIM generates, a cipher key CK, an integrity key IK and a network Authentication TokeN AUTN. The UMTS quintet is typically received in the PA_DATA field, as described earlier with reference to FIG. 6.

The sub-procedure exemplifies how a sequence number SQN can be embedded in the authentication and how it can be checked and further re-synchronised in case it is out of synchronisation.

The UMTS quintet has been generated typically by an AuC of a UMTS operator of the subscriber (USIM) using a shared secret K (corresponding to $K_i$, shared secret in GSM). The quintet is formed such that only two data items need to be transmitted to the USIM to enable it to obtain the entire quintet, namely the RAND and the AUTN. The client receives these two data items. The USIM then obtains the quintet using the AUTN, the RAND and the K. Typically, the USIM generates RES, CK and IK using just the K and the RAND, with respective three different authentication functions f2 to f4 known both by the USIM and the AuC.

The USIM also generates an expected message authentication code XMAC using the RAND, AUTN and K. The AUTN contains a field SQN⊕AK, wherein AK is an anonymity key, an Authentication Management Field AMF, and a Message Authentication Code MAC. The first-mentioned field allows the USIM to obtain the XMAC, to be compared against the MAC. The USIM first generates the AK using RAND and K with an authentication function f5. Next, the USIM computes (SQN⊕AK)⊕AK and obtains the SQN (note: the term of the formula that is in brackets is the field of AUTN and the AK in the end of the formula is obtained by the USIM). The USIM can then compute the XMAC with the K, the SQN, the AMF and the RAND, using a first authentication function f1.

The USIM compares the XMAC with the MAC which was included in the AUTN. If they are different, the client sends a user authentication reject message back to the AuC with an indication of the cause and the client abandons the ongoing authentication procedure. In this case, the AuC may initiate a new identification and authentication procedure towards the client.

The USIM also verifies that the received sequence number SQN is in the correct range. The SQN may not differ more than by a predetermined amount of the SQN held by the USIM. If the USIM considers the sequence number not to be in the correct range, it sends synchronisation failure message back to the AuC including an appropriate parameter, and abandons the ongoing procedure.

The above-described sub-procedure fits in the framework of the Kerberos-Authentication Service Exchange. It is further explained in the following in the framework of Kerberos based authentication service exchange.

The client c requests for a ticket$_{tgs}$ by sending a KRB_AS_REQ message to the AS. The message has the following basic format:
Options||ID$_c$||IMSI||Realm$_c$||ID$_{tgs}$||times||Nonce$_1$ The KRB_AS_REQ message is as in standard Kerberos, except that it contains the client's IMSI. The IMSI may be transmitted in the client identity field (ID$_c$), for example using the Kerberos name type PRINCIPAL, or a new name type reserved for UMTS. Kerberos supports various authentication mechanisms with the pre-authentication data (padata) field of the KRB_AS_REQ and KRB_AS_REP messages.

In an alternative embodiment the IMSI is transmitted using the Kerberos padata field. This has the advantage that the client uses an identity other than the IMSI as the ID$_c$ in all Kerberos messages, and IMSI has to be transmitted only once.

In yet another alternative embodiment, to avoid sending the IMSI in the subsequent Kerberos messages, the AS chooses an identity for the client c, generates the ticket for this new identity and transmits the identity with the ticket$_{tgs}$ of the KRB_AS_REP message.

The AS responds by a KRB_AS_REP message to the client c. The message KRB_AS_REP has the following basic format:
Realm$_c$||ID$_c$||Ticket$_{tgs}$||n RANDs||n AUTNs||E$_{Kc}$[K$_{c,tgs}$||times||Nonce$_1$||Realm$_{tgs}$||ID$_{tgs}$]
where n is an integer (at least 1), K$_c$=h(n CK, n Ik, Nonce$_1$) and the function h( ) is a one-way hash function. In an alternative embodiment, K$_c$=h(n CK, n IK, n RES, Nonce$_1$)

The KRB_AS_REP message is similar to the prior art Kerberos correspondent except that it contains n RANDs and AUTNs. The RANDs and AUTNs can be contained in the padata field of the KRB_AS_REP message.

On receipt of KRB_AS_REP, the client first verifies the n AUTNs as in standard UMTS AKA. If the n AUTN parameters check out properly, the client runs the UMTS AKA algorithms on the USIM and derives the K$_c$ from the n quintets and Nonce$_1$. Then the client is able to decrypt the encrypted portion of KRB_AS_REP and verify it, like in normal Kerberos authentication. If the verifications are successful, the client has obtained a ticket-granting ticket and a ticket-granting server session key. From this point onwards, the client operates as any other Kerberos client. The client does not need the USIM until the ticket$_{tgs}$ expires and the client needs to request a new ticket$_{tgs}$ by running the Authentication Service Exchange again (unless the USIM is needed for other purpose such as placing an ordinary UMTS telephone call).

As in standard Kerberos, in the UMTS AKA case the AS is also unable to verify that the KRB_AS_REQ is coming from a legitimate client c. On receipt of the KRB_AS_REQ message, the AS fetches UMTS quintets for the client, generates the K$_c$ key and sends the KRB_AS_REP message. The AS needs not save the K$_c$ key or any other status information for the client.

If the ticket was requested by a legitimate client (that is, the client c possessing the USIM having the IMSI used), the client can derive the key K$_c$ and decrypt the encrypted portion of the KRB_AS_REP message and obtain the ticket$_{tgs}$. As in standard Kerberos, only legitimate clients c are able to use the ticket$_{tgs}$ received in the KRB_AS_REP message.

Next, the client c obtains the SQN out of at least one rand and AUTN (typically the first ones of the n RANDs and AUTNs) and checks whether it is in the correct range.

Figure 10:
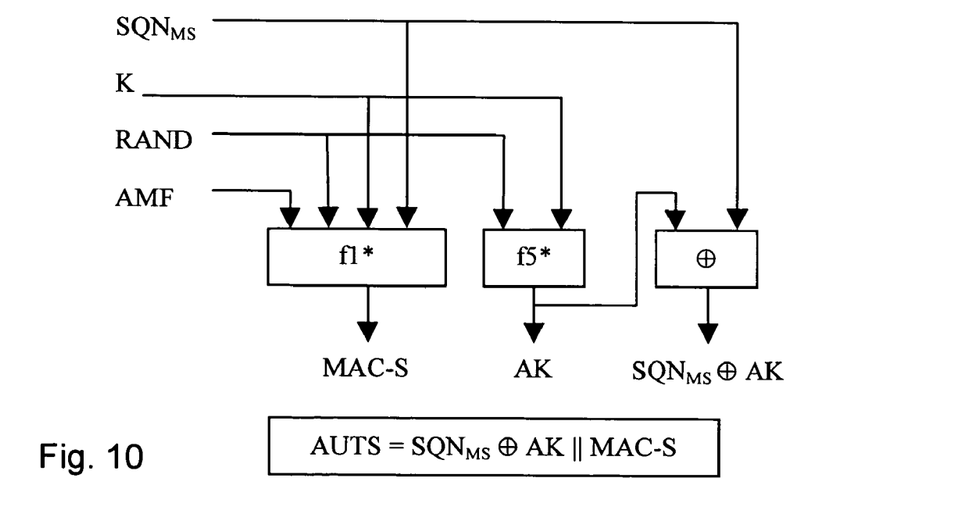
FIG. 10 shows the construction of the parameter AUTS.

If the SQN is in the correct range (not too far from the SQN$_{MS}$), the client c approves the ticket$_{tgs}$ and can use it. Otherwise, the client c sends a new KRB_AS_REQ as a re-synchronisation request message (in step (3)) containing an AUTS corresponding to the first RAND and AUTN. The AUTS is a parameter used to re-synchronise the SQN. The construction of the parameter AUTS is shown in FIG. 10. There a MAC-S (Message Authentication Code for the re-Synchronisation) is formed to be a part of the AUTS. The KRB_AS_REQ message used now has the following basic format:
Options||ID$_c$||IMSI||RAND||AUTS||Realm$_c$||ID$_{tgs}$||times||Nonce$_1$ Responsive to the re-synchronisation request message, the AS causes the AuC to synchronise its SQN with the USIM (to SQN$_{MS}$), retrieves a new set of UMTS quintets and sends them to the client c a new KRB_AS_REP message which is now formed using the synchronised SQN (i.e. where the RANDs and AUTNs are based on SQNs in syncronisation with the USIM's SQN$_{MS}$). The KRB_AS_REP now has the following basic format:
Realm$_c$||ID$_c$||Ticket$_{tgs}$||n RANDs||n AUTNs||E$_{Kc}$[K$_{c,tgs}$||times||Nonce$_1$||Realm$_{tgs}$||ID$_{tgs}$]

It is a remarkable advantage of this embodiment that UMTS authentication can be extended to Kerberos compliant Ticket Granting server and Kerberos Service Servers (also known as application servers) without any modifications to them. It suffices that the Kerberos client and the AS are UMTS AKA aware. The Kerberos TGS and service servers-V need not to be UMTS AKA aware. The AS may have an interface to the UMTS authorisation network, similarly as the network Operator Wireless LAN (OWLAN) AS to the GSM network. The Nokia Authentication Server is an example of such an OWLAN AS.

The different embodiments of the invention allow use of various telecommunications network identifying modules, including SIMs and USIMs, for authenticating clients to various other data networks or their services using tickets that grant the access to them or their services. For example, a UMTS mobile telecommunication device can use both UMTS telecommunications services provided by its telecommunications operator (over radio interface) and Wireless (and/or wired) LAN services. The device can obtain a strong and relatively reliable first authentication key or session key K$_c$ based on the device's user identification module and use that session key without need to send back any "signed response" such as RES or SRES and thus that data can further be used in creation of the session key.

Moreover, the generation of the session key based on the mobile telecommunications network's credentials (GSM triplet data or UMTS quintet data) allows fast handovers for access point roaming.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
receiving client identity information comprising a subscriber identity for a client;
in response to receiving the subscriber identity, obtaining, for an authentication server, an authentication vector comprising at least one challenge and at least one first secret based at least on the subscriber identity of the client;
generating a first instance of a first authentication key using the at least one first secret;
encrypting first credentials using the first instance of the first authentication key;
and providing data to the client, the data comprising the at least one challenge and the encrypted first credentials, wherein the provided data enables the client to derive a client version of the first authentication key with the provided data for use in authenticating the client independent of any response based on a client's secret from the client.

2. The method according to claim 1, wherein the authentication vector is formed in such a way that the provided data comprising the at least one challenge and the encrypted first credentials enables the client to obtain the authentication vector in its entirety.

3. The method according to claim 1, wherein the client version of the first authentication key is a session key.

4. The method according to claim 1, wherein the first authentication key is based on two or more first secrets.

5. The method according to claim 1, wherein obtaining the at least one challenge and at least one first secret based at least on the client identity information occurs before a need arises to authenticate the client.

6. The method according to claim 1, wherein a collection of challenges and first secrets sufficient for forming at least two first credentials for the client is obtained in a batch before a need arises to authenticate the client.

7. The method according to claim 6, wherein the collection is obtained for a group of clients.

8. The method according to claim 1, wherein the subscriber identity is an international mobile subscriber identity.

9. The method according to claim 1, further comprising forming by the authentication server an identification for use in a following authentication message for the client.

10. The method according to claim 1, further comprising receiving a replay attack protector from the client to the authentication server; and
wherein the first authentication key is based on a hash function of at least the first secret and the replay attack protector.

11. The method according to claim 1, wherein the first credentials are formed by operations comprising:
encrypting first information corresponding to the client with a second authentication key not known by the client; and
verifying that the first information has been encrypted using the second authentication key.

12. An apparatus comprising:
at least one processor; and
at least one memory including computer program code, where the at least one memory and the computer program code are configured, with the at least one processor, to cause the apparatus to at least:
receive client identity information comprising a subscriber identity for a client;
in response to receiving the subscriber identity, obtain an authentication comprising at
least one challenge and at least one first secret based at least on the client identity information; generate a first authentication key using the at least one first secret; and encrypt first credentials using the first authentication key; and
provide data to the client, the data comprising the at least one challenge and the encrypted first credentials, wherein the provided data enables the client to derive a client version of the first authentication key with the provided data for use in authenticating the client independent of any response based on a client's secret from the client.

13. The apparatus according to claim 12, wherein the authentication vector is formed in such a way that the provided data comprising the at least one challenge and the encrypted first credentials enables the client to obtain the authentication vector in its entirety.

14. The apparatus according to claim 12, wherein the client version of the first authentication key is a session key.

15. The apparatus according to claim 12, wherein the at least one memory including the computer program code is configured, with the at least one processor, to cause the apparatus to provide the client with the at least one challenge and the encrypted first credentials in a common message.

16. The apparatus according to claim 12, wherein the at least one challenge and the at least one first secret based on a client's secret specific to the client are obtained before a need arises to authenticate the client.

17. The apparatus according to claim 12, wherein the at least one memory including the computer program code is configured, with the at least one processor, to cause the apparatus to obtain in a batch a collection of challenges and first secrets sufficient for forming at least two first credentials for the client before a need arises to authenticate the client.

18. The apparatus according to claim 17, wherein the collection is for a group of clients.

19. The apparatus according to claim 12 wherein the at least one memory including the computer program code is configured, with the at least one processor, to cause the apparatus to form an identification for use in a following authentication message for the client.

20. A non-transitory computer readable medium that stores a computer program configured to control an apparatus to perform operations comprising:
receiving client identity information comprising a subscriber identity for a client; in response to receiving the subscriber identity, obtaining an authentication vector comprising at least one challenge and at least one first secret based at least on the subscriber identity for the client;

generating a first authentication key using the at least one first secret;

encrypting first credentials using the first authentication key; and providing data to the client, the data comprising the at least one challenge and the encrypted first credentials to the client, wherein the provided data enables the client to derive a client version of the first authentication key with the provided data for use in authenticating the client independent of any response based on a client's secret from the client.

21. The apparatus according to claim 20, wherein the client version of the first authentication key is a session key.

22. An apparatus comprising:
at least one processor; and
at least one memory including computer program code, where the at least one memory and the computer program code are configured, with the at least one processor, to cause the apparatus to at least:
provide an authentication server with client identity information comprising a subscriber identity for a client;
in response to providing the subscriber identity, receive at least one challenge and encrypted first credentials;
using the at least one challenge and the encrypted first credentials, compute a response; and
based on the computed response being an expected response, obtaining, for the client, a new authentication key for use in a subsequent authentication of the client, wherein the received at least one challenge and the encrypted first credentials enable the client to compute the response for the new authentication key independent of any response based on a client's secret from the client.

23. The apparatus according to claim 22, wherein the at least one memory including the computer program code is configured, with the at least one processor, to cause the apparatus to form an authentication vector using the at least one challenge and the encrypted first credentials; and to use the formed authentication vector to decrypt the encrypted first credentials.

24. The apparatus according to claim 22, wherein the at least one challenge and the at least one first secret correspond to a particular at least one sequence number, and the at least one memory including the computer program code is configured, with the at least one processor, to cause the apparatus to:
convey the at least one sequence number;
maintain a sequence number counter at the client;
obtain the sequence number using at least one of the at least one challenge and the at least one first secret; and
check if the sequence number falls within a predetermined range.

25. The apparatus according to claim 24, wherein the at least one memory including the computer program code is configured, with the at least one processor, to cause the apparatus to initiate a sequence number synchronization in case the sequence number does not fall within the predetermined range.

26. The apparatus according to claim 22, wherein the at least one memory including the computer program code is configured, with the at least one processor, to, for the case computed response is not an expected response, cause the apparatus to send a synchronization update message to the authentication server, wherein the synchronization update message comprises a sequence number of the client.

27. The apparatus according to claim 22, wherein the first authentication key is based on two or more first secrets.

28. The apparatus according to claim 22, wherein the subscriber identity is an international mobile subscriber identity.

29. The apparatus according to claim 22, wherein the at least one memory including the computer program code is configured, with the at least one processor, to cause the apparatus to send a replay attack protector from the client to the authentication server, and wherein the first authentication key is based on a hash function of at least the first secret and the replay attack protector.

30. The apparatus according to claim 22, wherein the at least one memory including the computer program code is configured, with the at least one processor, to cause the apparatus to generate a service request message using cryptographically the first decrypted credentials.

31. The apparatus according to claim 22, wherein the new authentication key is a session key.

* * * * *